United States Patent

[11] 3,591,948

| [72] | Inventors | Berstrand L. Brumbaugh<br>Perry;<br>Eugene P. Brumbaugh, Fort Valley, Ga.;<br>Claude A. Riché, Thibodaux, La. |
|---|---|---|
| [21] | Appl. No. | 756,697 |
| [22] | Filed | July 10, 1968 |
| [45] | Patented | July 13, 1971 |
| [73] | Assignee | Thomson Machinery Co.<br>Thibodaux, La.<br>by said Riché, a part interest |

[54] HARVESTER FOR NUTS AND THE LIKE
10 Claims, 7 Drawing Figs.

[52] U.S. Cl............................................... 56/328 R,
209/137
[51] Int. Cl........................................................A01d 51/00
[50] Field of Search............................................ 56/328;
209/248, 24—37, 134, 135, 136, 137, 138, 139

[56] References Cited
UNITED STATES PATENTS

| 2,780,904 | 2/1957 | Bowie et al. | 56/328 |
| 2,781,625 | 2/1957 | Phelps et al. | 56/328 |
| 2,870,594 | 1/1959 | Larsh | 56/328 |
| 3,105,343 | 10/1963 | Anderson et al. | 56/328 |
| 3,107,475 | 10/1963 | Gustafson | 56/328 |
| 3,182,437 | 5/1965 | Ramacher et al. | 56/328 |
| 3,387,426 | 6/1968 | Henson | 56/328 |
| 3,475,889 | 11/1969 | Overstreet et al. | 56/328 |

*Primary Examiner*—Russell R. Kinsey
*Attorney*—Ralph R. Browning

ABSTRACT: A harvester is disclosed that sweeps nuts and the like from the ground along with other debris, such as leaves and sticks, and separates the nuts from most of such debris before conveying the nuts to storage. The nuts, along with the debris picked up with them, are transferred into a cylinder having perforated sidewalls that is mounted for rotation around its longitudinal axis. The longitudinal axis of the cylinder is horizontal so that the nuts and debris are carried upwardly along an arcuate path by the upwardly moving sidewall of the cylinder. The inner surface of the cylinder has pockets in which the nuts collect. A stream of air is directed through the perforated sidewall of the cylinder to blow the debris upwardly away from the nuts into another airstream that carries the debris out of the cylinder. The nuts continue upwardly with the sidewall until they are blown away from the sidewall into a hopper positioned inside the cylinder. From the hopper, the nuts are transferred to a storage bin by a belt conveyor and a pivotally mounted chute having a perforated bottom. The chute is arranged so that transverse flights on the belt, which move the nuts with the belt, cause the chute to oscillate and bounce the nuts as they pass through the chute. This further cleans the nuts prior to their reaching the storage bin.

Eugene P. Brumbaugh
Bertrand L. Brumbaugh
Claude A. Riché
INVENTORS.

BY Brumbaugh, Hyer, Eickensoht + Thompson

ATTORNEYS

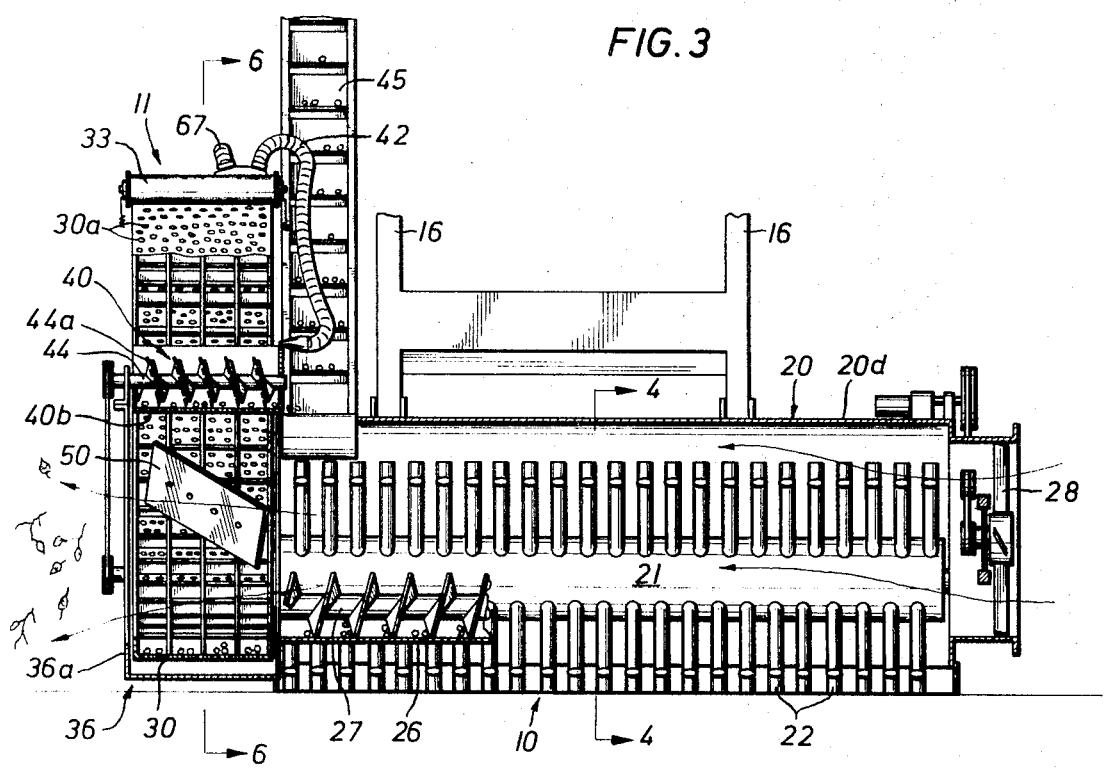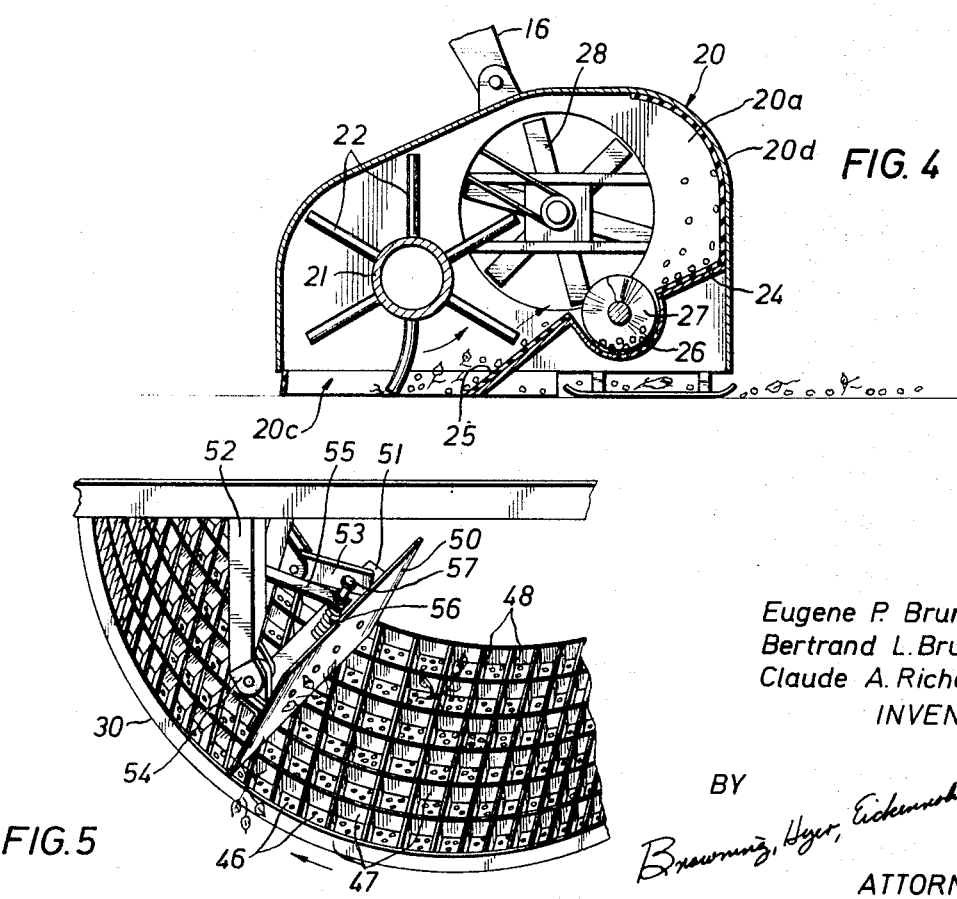

PATENTED JUL 13 1971 3,591,948

Eugene P. Brumbaugh
Bertrand L. Brumbaugh
Claude A. Riché
INVENTORS

BY
Browning, Hyer, Eickenroht + Thompson

ATTORNEYS

HARVESTER FOR NUTS AND THE LIKE

This invention relates to harvesters for nuts and the like and in particular to such harvesters that will pick the nuts up from the ground and then separate the nuts from at least most of the debris, such as leaves, sticks, and twigs, that is picked up with the nuts.

The harvester of this invention can be used to gather almost anything that is laying on the ground and which is heavier than the debris, such as leaves and sticks, that will be picked up with it. Primarily, however, it is intended to gather nuts, such as pecans. Nuts, as opposed to most tree fruit, are always gathered after the nuts have fallen from the tree onto the ground. Usually, nuts do not fall from the tree until the fall of the year. Therefore, not only will the nuts have fallen to the ground, but most of the tree leaves will have fallen onto the ground also. In addition, there will usually be a collection of dead wood on the ground, such as small twigs and sticks, which have been broken off the tree. This is particularly true if the tree has been thrashed, such as by shaking the tree mechanically or by whipping the limbs with long cane poles to cause the nuts to fall to the ground.

The nuts can, of course, be gathered by hand from among the leaves and sticks. When gathering the nuts mechanically, however, it is necessary to pick up everything that is loose, including most of the leaves and sticks, in order to get the nuts. The problem then is to provide a harvester that will not only sweep the ground clean of most of the loose material laying on it, to make sure that substantially all of the nuts are picked up, but which will also efficiently and quickly separate the nuts from at least most of the debris and dump the debris back on the ground. It is an object of this invention to provide such a harvester.

It is another object of this invention to provide a harvester that can separate nuts from a large volume of leaves and sticks thereby permitting the harvester to remove substantially all loose material from the ground thereby gathering substantially all the nuts from the ground over which the harvester travels.

It is yet another object of this invention to provide a harvester for nuts and the like that separates the nuts from most of the debris picked up with the nuts shortly after the nuts and debris are picked up and close to the ground level to keep the time the debris is handled to a minimum.

It is another object of this invention to provide a harvester that will gather nuts from the ground with a minimum of damage to the nuts.

It is another object of this invention to provide a harvester for nuts and the like that employs an open-ended revolving cylinder that carries the nuts and debris upwardly on its moving sidewall through a stream of air that blows the debris away from the nuts with the nuts continuing upwardly with the moving sidewall until they are blown from the sidewall into a hopper for movement to a storage bin.

These and other objects, advantages, and features of this invention will be apparent to those skilled in the art from a consideration of this application including the attached drawings and appended claims.

The invention will be described in detail in connection with the attached drawings in which, FIG. 1 is a side view of the preferred embodiment of the harvester of this invention mounted on a tractor;

FIG. 3 is a sectional view taken along line 3—3 of FIG. 1 and including a short section of one of the conveyors used in the harvester;

FIG. 4 is a sectional view through the front portion of the harvester that picks up the nuts and debris from the ground, the view being taken along line 4—4 of FIG. 3;

FIG. 5 is a fragmentary isometric view of the rotating cylinder employed in the preferred embodiment of the invention to separate most of the debris from the nuts, in a manner to be explained below;

Figure 1:
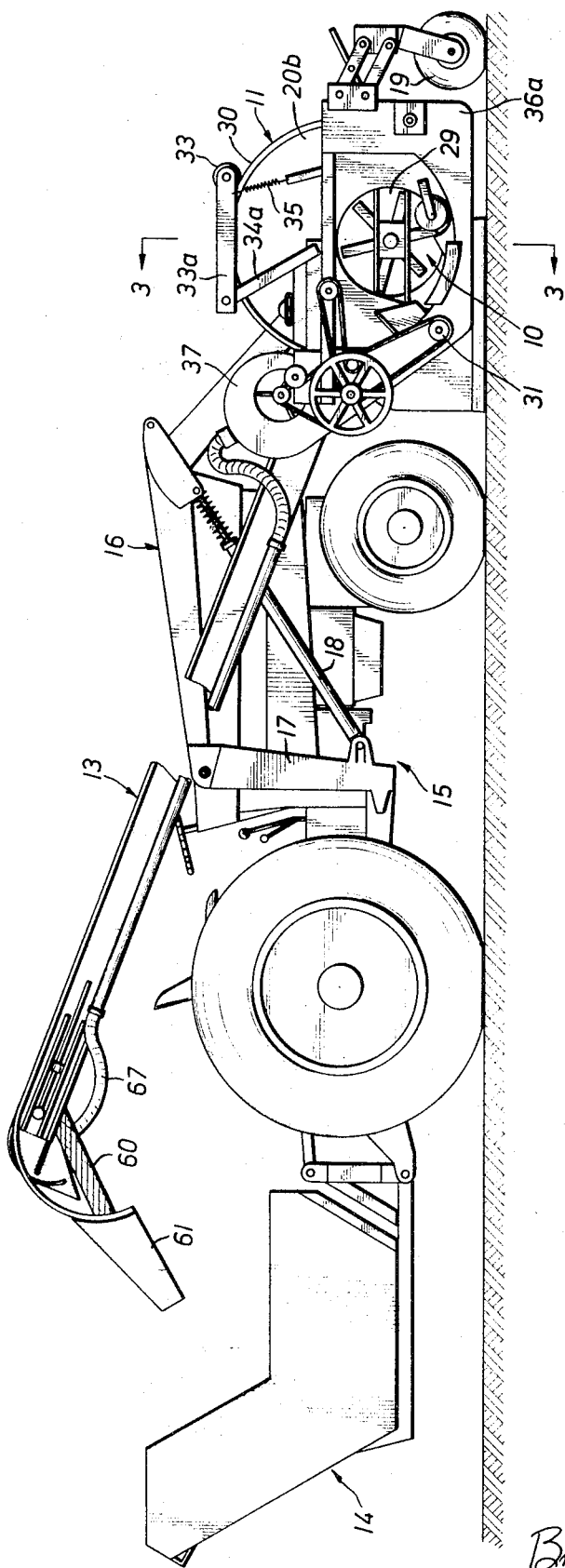
Figure 2:
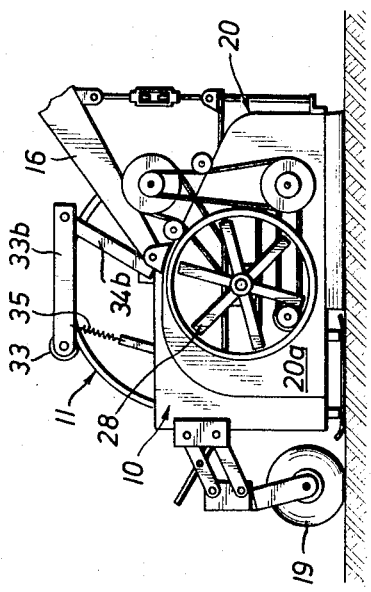
FIG. 2 is a view of the front portion only of the harvester of FIG. 1 looking from the other side.

The harvester can be divided into four sections for discussion purposes. These are: nut and debris gathering section 10, nut and debris separating section 11, nut-conveying section 13, and nut storage bin 14. The first three sections are mounted on the front of the tractor with nut and debris gathering section 10 positioned for movement along the ground ahead of the tractor. These three sections are supported on the tractor by L-shaped arms 16, located on opposite sides of the tractor. The arms each have one end rigidly connected to the harvester and the other end pivotally connected to mounting posts 17 on the tractor. A pair of hydraulic cylinders 18, one of which is located on each side of the tractor, are positioned to pivot arms 16 up and down to move nut and debris gathering section 10 into and out of engagement with the ground. When harvesting, caster wheel 19 engages the ground and helps support the weight of at least a portion of the forward sections of the harvester. It also controls the spacing of the gathering section from the ground.

Storage bin 14 is separately mounted on the rear of the tractor. Preferably it is mounted so it can be raised by the tractor and pivoted to dump the nuts from the bin from time to time, as the bin becomes full.

The nut and debris gathering section of the harvester is best seen in FIGS. 3 and 4. It includes generally rectangularly shaped housing 20, which encloses means for sweeping the ground of nuts and debris as the tractor moves the harvester over the ground. In the embodiment shown, cylinder 21 extends horizontally between sidewalls 20a and 20b of housing 20 and is supported for rotation on appropriate bearings. A plurality of angularly shaped rows of resilient fingers 22 extend radially from the periphery of the cylinder. The fingers in each adjacent row are staggered, so that the fingers will sweep the entire surface of the ground over which the harvester travels. The fingers are made of resilient material, such as rubber, and cylinder 21 is positioned in housing 20 so that the fingers will be bent as they move into engagement with the ground. This causes the fingers to straighten with a snap action as they move upwardly away from the ground and flip upwardly ahead of the fingers any nuts, debris, or other loose material ahead of them on the ground. The drum is rotated counterclockwise, as viewed in FIG. 4, and thus the loose material swept from the ground by the fingers is thrown in the direction of travel of the harvester.

Housing 20 has opening 20c in the bottom thereof to permit the fingers to extend out of the housing into engagement with the ground. Baffle plate 24 extends across housing 20 between end walls 20a and 20b in front of the fingers. The baffle is inclined from the vertical, as shown, and includes a circular cavity 26 about midway between its edges, in which is located screw conveyor 27. The baffle plate and the front curved portion 20a of the top wall of the housing is covered with pad 25 of a shock-absorbing material, such as foam rubber. The pad of shock absorbing material not only keeps the nuts from being damaged, when they are thrown against the baffle plate and housing by fingers 22, but also keeps the nuts from bouncing back into the revolving fingers onto the ground behind the fingers by dampening the blow of the nuts against the housing or baffle plate 24. Thus, the nuts will strike the top wall of the housing, fall downwardly onto the inclined surface of baffle 24 and roll into the arcuate section of the baffle to be carried laterally by screw conveyor 27.

Fan 28 is mounted in sidewall 20a of housing 20 to direct a stream of air through the housing and out opening 29 in end wall 20b at the opposite end of the housing. The nuts and debris that are flipped upwardly by fingers 22, will pass through the stream of air from fan 28 and some of the lighter debris will be separated from the nuts and blown laterally out of housing 20 through opening 29. The rest of the debris along with the nuts will collect in circular cavity 26 and fall down to be moved laterally by screw conveyor 27.

Figure 6:
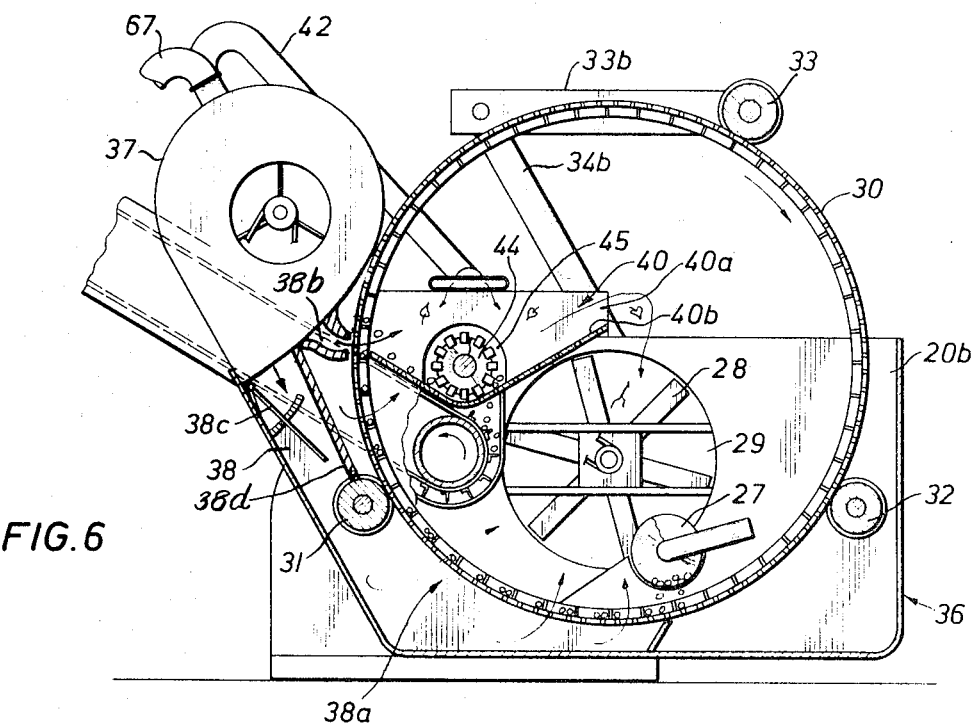
FIG. 6 is a sectional view of the front portion of the harvester taken along line 6—6 of FIG. 3.

The nuts and debris from the ground are carried by screw conveyor 27 into debris and nut separating section 11 of the harvester. In accordance with this invention, this includes means for moving the nuts and debris upwardly along an arcuate path through an upwardly directed stream of air that will blow most of the debris upwardly away from the nuts, while leaving the nuts to continue with the upwardly moving means until they fall or are blown therefrom into a hopper. In the embodiment shown, cylinder 30 moves the nuts and debris upwardly along this arcuate path. Means are provided to mount cylinder 30 with its longitudinal axis generally horizontal and for rotation around its longitudinal axis. The cylinder is positioned so that its cylindrical sidewall will pass adjacent to and below the level of the discharge of screw conveyor 27 so that the nuts and debris carried laterally by the screw conveyor will be dumped onto the moving sidewall of the cylinder and carried upwardly to the left as shown in FIG. 6. Cylinder 30 is rotatably supported by rollers 31 and 32. The rollers are supported on one end by end wall 20b and on the other by sidewall 36a of cylinder housing 36. The cylinder is rotated by roller 31 which is driven by the power takeoff of tractor 15 through a conventional belt or chain-drive arrangement. Roller 33 is positioned on the upper side of the cylinder. This idler roller is mounted for rotation between the ends of parallel arms 33a and 33b, on opposite sides of cylinder 30. The other ends of the arms are pivotally connected to rigid posts 34a and 34b. Springs 35 exert a downward resilient force on cylinder 30 through arms 33a and 33b and idler 33 to hold the cylinder in positive engagement with idler roller 32 and drive roller 31.

The sidewall of cylinder 30 is provided with a large number of perforations 30a, which will let air flow freely through the sidewall, but which are small enough to prevent nuts from falling through. As the cylinder rotates clockwise, as shown in FIG. 6, carrying the nuts and debris from screw conveyor 27 upwardly in an arcuate path, means are provided for directing a stream of air through perforations 30a to blow the debris upwardly into the laterally flowing airstream coming from opening 29 in the sidewall of housing 20. The latter airstream is provided by fan 28, as described above.

In the embodiment shown, blower 37 directs a stream of air into duct 38, which is formed by housing 36 and partition 38d that extends from the outlet of the blower to roller 31. Adjustable damper or baffle 38c controls the volume of air flowing to area 38a adjacent duct 38. The stream of air from area 38a is directed radially inward with respect to the side of the cylinder and tends to blow debris upwardly away from the nuts, as they are carried upwardly along an arcuate path by the sidewall of cylinder 30. As the debris is blown up, it is directed into the transverse stream of air coming from fan 28, as described above, and blown laterally out of the open end of cylinder 30.

As the nuts are carried along the arcuate path of the side of cylinder 30 they will reach a point where they will tend to fall. Opposing this tendency is the centrifugal force imposed on the nuts by the rotating cylinder, which tends to hold the nuts against the sidewall of the cylinder. To make sure that the nuts leave the sidewall at the desired point and also to remove the additional debris, a high-velocity stream of air is directed radially inward through the perforated sidewall of the cylinder through duct 38b. This blows the nuts and remaining debris away from the cylinder. The nuts will fall into hopper 40. The hopper has two end walls and a bottom wall that is trough-shaped, as shown in FIG. 6. Only end wall 40a can be seen clearly in the drawings, but preferably, the other end wall is not as high as is wall 40a. Trough-shaped bottom 40b is perforated like the sidewall of cylinder 30 to permit small debris to fall through. The debris that is blown from the cylinder with the nuts will be carried over hopper 40 and will fall into the laterally moving airstream from fan 28. To further clear the nuts of debris another laterally flowing airstream is provided by duct 42. The stream from duct 42 will blow some of the debris out the end of cylinder 30 to the side of the harvester.

Screw conveyor 44 in the tough-shaped bottom of hopper 40 moves the nuts laterally through opening 45 in sidewall 40a of the hopper. Conveyor 44 deposits the nuts on belt conveyor 45, as shown in FIG. 3, which carries the nuts upwardly toward storage bin 14 at the rear of the tractor. The edges of screw conveyor 44 comprise a plurality of closely spaced flaps 44a of resilient material, such as canvas belting or rubber. This reduces the damage caused to the nuts by the conveyor, by allowing the nuts to pass under the conveyor if necessary.

Means are provided on the inside surface of the sidewall of the cylinder to hold the nuts in place on the sidewall until they fall from it by gravity, i.e., means are provided to keep the nuts from sliding down the sidewall. In the embodiment shown, the inside surface of the cylinder is provided with a plurality of pockets 46 into which the nuts can collect and be carried upwardly by the cylinder. These pockets are formed by a plurality of spaced parallel rings 47 and transverse partitions 48, which extend between the spaced rings. The pockets thus formed are not only designed to allow the nuts to collect therein, but also to keep the large debris, such as large leaves and sticks, out of the pockets. Thus, the nuts will be separated from much of the debris simply by falling into pockets 47 leaving the debris riding on top of the lattice work of rings and transverse pieces. The nuts can ride in the pockets half way to the top of the cylinder. At this point, they will begin to roll out of the pockets, but by then they will fall into hopper 40.

Means are provided to keep large amounts of debris from moving upwardly with the sidewall of the cylinder. In the embodiment shown, deflector 50 is positioned to ride on the top surface of hoops or rings 47 to limit the distance the debris that is outside of the pockets can travel with the cylinder. The deflector is located part way up the side of the cylinder and is positioned at an angle to the axis of the cylinder to deflect the debris toward the open end of the cylinder and out onto the ground along side the harvester. The deflector, preferably, is made of a resilient material, again rubber or canvas belting is suitable. It is mounted so that the lower section thereof directly above pockets 46 will give, as required, to permit sticks, etc. that are caught in the pockets to pass below the deflector. The deflector should have sufficient stiffness, however, to exert a considerable force on the debris to keep it from passing below it except where necessary. Also, the deflector is pivotally mounted to move out of the way as required to keep debris from jamming in between the cylinder and the deflector and interfering with the operation of the machine. The resilient strip is mounted on angle iron 51, which, in turn, is pivotally supported on bracket 52 by pivot arms 53 and 54. Arm 55 is also attached to the bracket with one end positioned over one flange of angle iron 51. Coil spring 56 is positioned between the end of arm 55 and the flange of angle iron 51 to exert a resilient force urging the deflector to pivot toward and into engagement with the inside surface of the cylinder. Screw 57 permits the force exerted by spring 56 to be adjusted.

Figure 7:
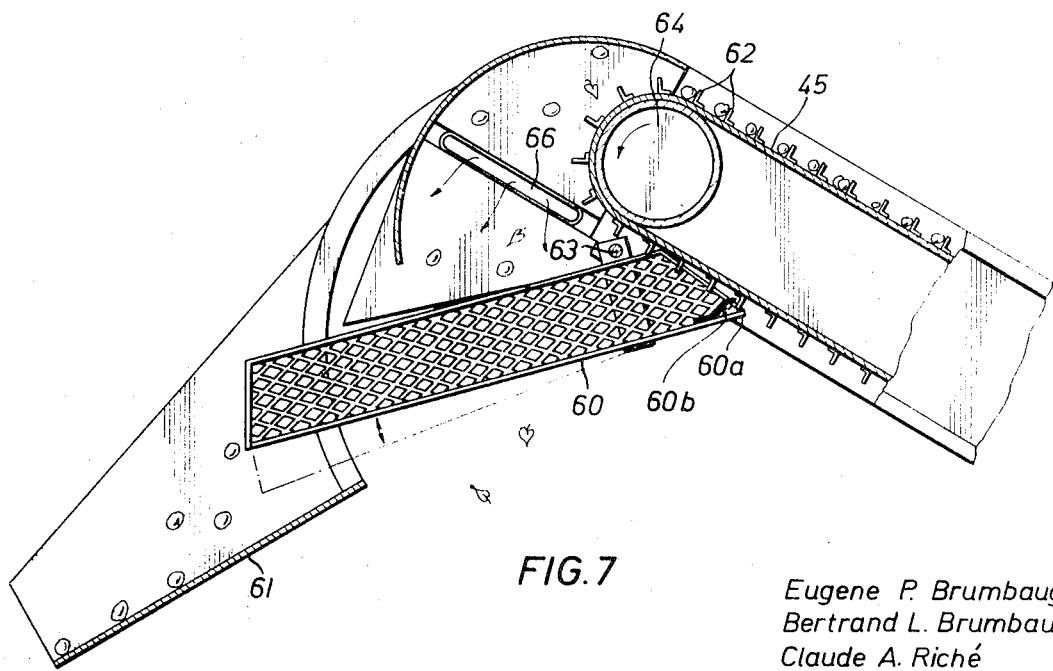
FIG. 7 is a view, partially in vertical section and partially in side elevation, of the rearward end of the conveyor system that transfers the nuts from the front of the tractor to the storage bin, and which separates additional debris from the nuts just before the nuts enter the storage bin.

Referring now to FIG. 7, when the nuts reach the end of conveyor 45, they are dumped into chute 60, which directs the nuts into chute 61, from where they pass into storage pin 14. To keep the nuts from hopper 40 in position on belt 45, it is provided with a plurality of spaced transverse flights 62. Chute 60 in turn is mounted to pivot around pin 63. The major portion of the chute is on the side of pin 63 away from belt 45, so that the rear end of the chute will tend to pivot downwardly and assume an inclined position leading from the end of belt 45 to chute 61. Further, chute is positioned so end 60a is pivoted clockwise around pivot pin 63 as each flight 62 passes. This causes the chute to oscillate between the solid and dotted line positions shown in FIG. 7. The flights engage plate 60b on the inside of chute 60 adjacent end 60a. The plate, preferably, is a strip of sheet metal which can be bent to change the amount of interference it makes with the flights on the conveyor belt. This allows the angle through which the chute is oscillated to be adjusted.

Thus, as the conveyor belt is driven around end pulley 64, the flights thereon will cause chute 60 to oscillate around pin 63 and shake and bounce the nuts up and down as they slide through the chute. This motion is provided to knock loose any debris which still may be clinging to the nuts, such as dirt or hulls before the nuts reach the storage bin. The side and bottom of chute 60 have openings through which this material can fall. This debris will be bounced and thrown upwardly by the oscillating action of the chute and to help blow it out of the way, air duct 66 is positioned to direct a stream of air transversely across the top of chute 60. Air conduit 67 brings air from blower 37 for this purpose.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what we claim is:

1. A harvester for nuts and the like, mounted on transport means for moving said harvester over the ground, comprising: a gathering section carried adjacent the ground and adapted for sweeping nuts and debris, such as leaves and twigs, from the ground; a separating section adjacent said gathering section, to which said nuts and debris may be carried by conveyor means mounted in said gathering section, said separating section comprising an open-ended cylinder with a perforated sidewall mounted for substantially horizontal rotation about its longitudinal axis; blower means mounted on said harvester for directing a first stream of air into one end of said cylinder and out the other substantially parallel to its longitudinal axis and for directing a second stream of air through a portion of said perforated sidewall to blow at least a portion of said debris away from said sidewall into said first airstream for lateral movement by said first airstream out of said cylinder.

2. The harvester of claim 1 in which the perforations of said sidewall are small enough to prevent said nuts from falling therethrough and in which the inside surface of said sidewall is provided with a plurality of pockets formed by partitions that extend from the inside surface toward the center of said cylinder to carry said nuts and debris past said second airstream where said debris is blown away from said nuts.

3. The harvester of claim 2 further provided with a hopper located inside said cylinder to receive said nuts from said pockets after said nuts have passed said second airstream.

4. The harvester of claim 3 further provided with a conveyor section, one end of which is connected to said separating section, said conveyor section being provided with means for conveying said nuts from said hopper to a storage bin mounted at the opposite end of said conveyor section.

5. The harvester of claim 4 in which said conveyor section includes a belt conveyor having spaced transverse flights for moving said nuts from said hopper to said storage bin and a chute with a perforated bottom surface for transferring said nuts from the belt conveyor to said storage bin, means pivotally mounting said chute for pivotal movement around a horizontal axis intermediate the ends of the chute with said axis located for the end of the chute away from said conveyor belt to tend to pivot downwardly, said chute being located so each flight on said conveyor belt will engage the end of said chute adjacent thereto and pivot the outer end upwardly to bounce said nuts thereon and to shake loose debris that may be clinging to said nuts so said debris can fall through said perforated bottom of said chute before said nuts enter said storage bin.

6. A nut harvester comprising: a gathering section mounted adjacent the ground on a vehicle for moving over the ground to pickup nuts laying on the ground along with a certain amount of leaves, sticks and other debris, said gathering section comprising first blower means for directing a first airstream through said gathering section transverse to the direction of vehicle movement to separate a substantial portion of said debris from said nuts; and a separating section, comprising a separator device and second blower means, adjacent said gathering section and in the path of said first airstream, said gathering section having conveyor means by which said nuts and remaining debris are deposited on a perforated surface of said separator device, said separator device being movably mounted in said separator section so that said perforated surface moves perpendicular to said first airstream and by a second airstream from said second blower means so that a substantial portion of said remaining debris is blown from said nuts into said first airstream for lateral movement away from said harvester.

7. The harvester of claim 6 in which said separating device comprises an open-ended cylinder, the inside surface of which comprises said perforated surface, with its longitudinal axis horizontal and adapted for rotation around said axis, power means connected to said cylinder for rotating it around said axis, and means on the inside surface of said cylinder for carrying the nuts deposited thereon upwardly along an arcuate path until they fall therefrom by gravity into a hopper mounted inside said cylinder.

8. The harvester of claim 7 in which said inside surface of the cylinder is provided with a plurality of pockets into which said nuts are deposited and carried upwardly until they fall from said pockets into said hopper.

9. The harvester of claim 8 further provided with a deflector for engaging debris above said pockets to urge said debris out of one end of said cylinder, said deflector being attached to a nonmovable portion of said harvester and mounted at an angle relative to the axis of said cylinder.

10. The harvester of claim 7, characterized in that said cylinder is rotatably supported by a plurality of rollers which engage the periphery of said cylinder to leave the interior of said cylinder free of any obstructions, at least one of said rollers being connected to said power means to rotate said cylinder